June 16, 1959  J. G. INGRES  2,890,771
BOOSTER MOTOR CONTROL MECHANISM
Filed Oct. 20, 1954  3 Sheets-Sheet 3
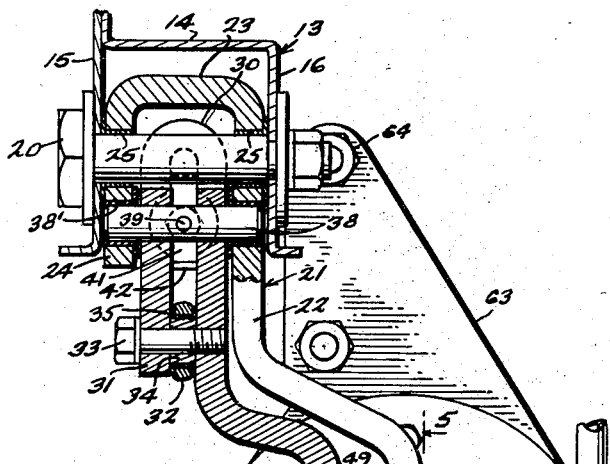
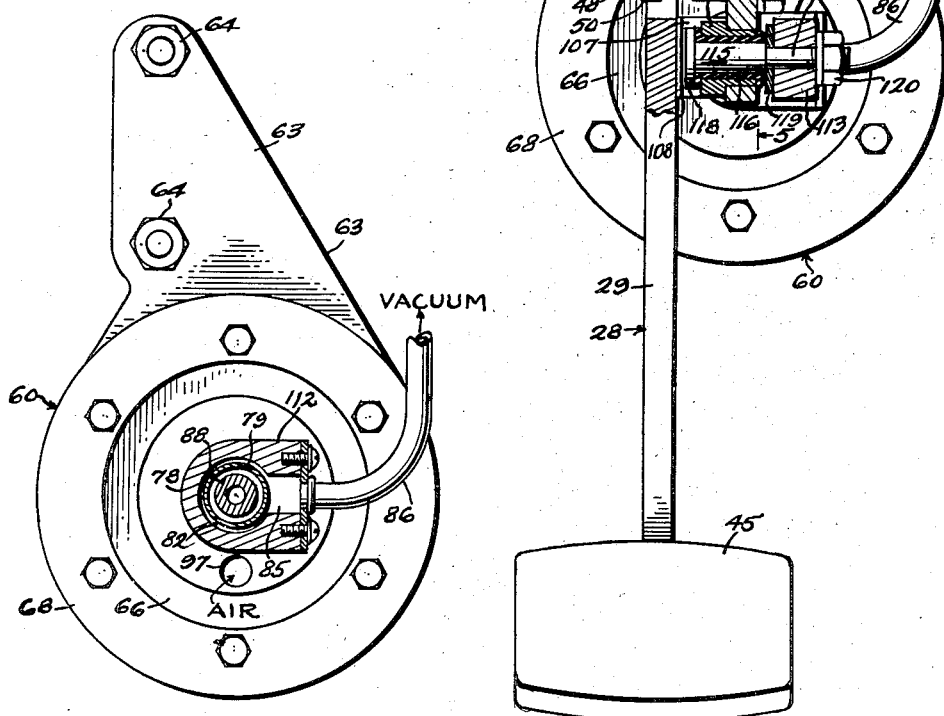
INVENTOR
JEANNOT G. INGRES
BY John F. Phillips
ATTORNEY

United States Patent Office 2,890,771
Patented June 16, 1959

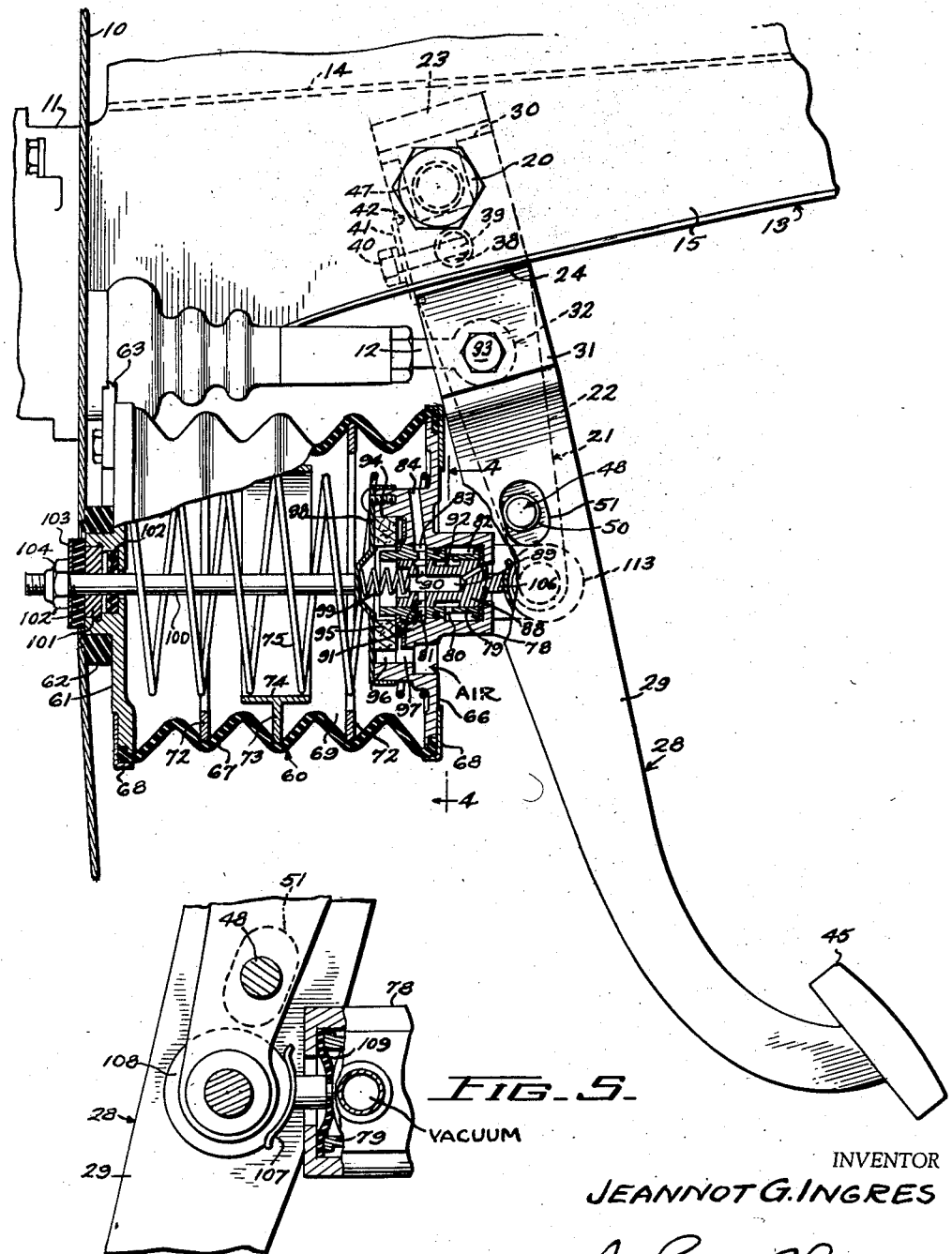

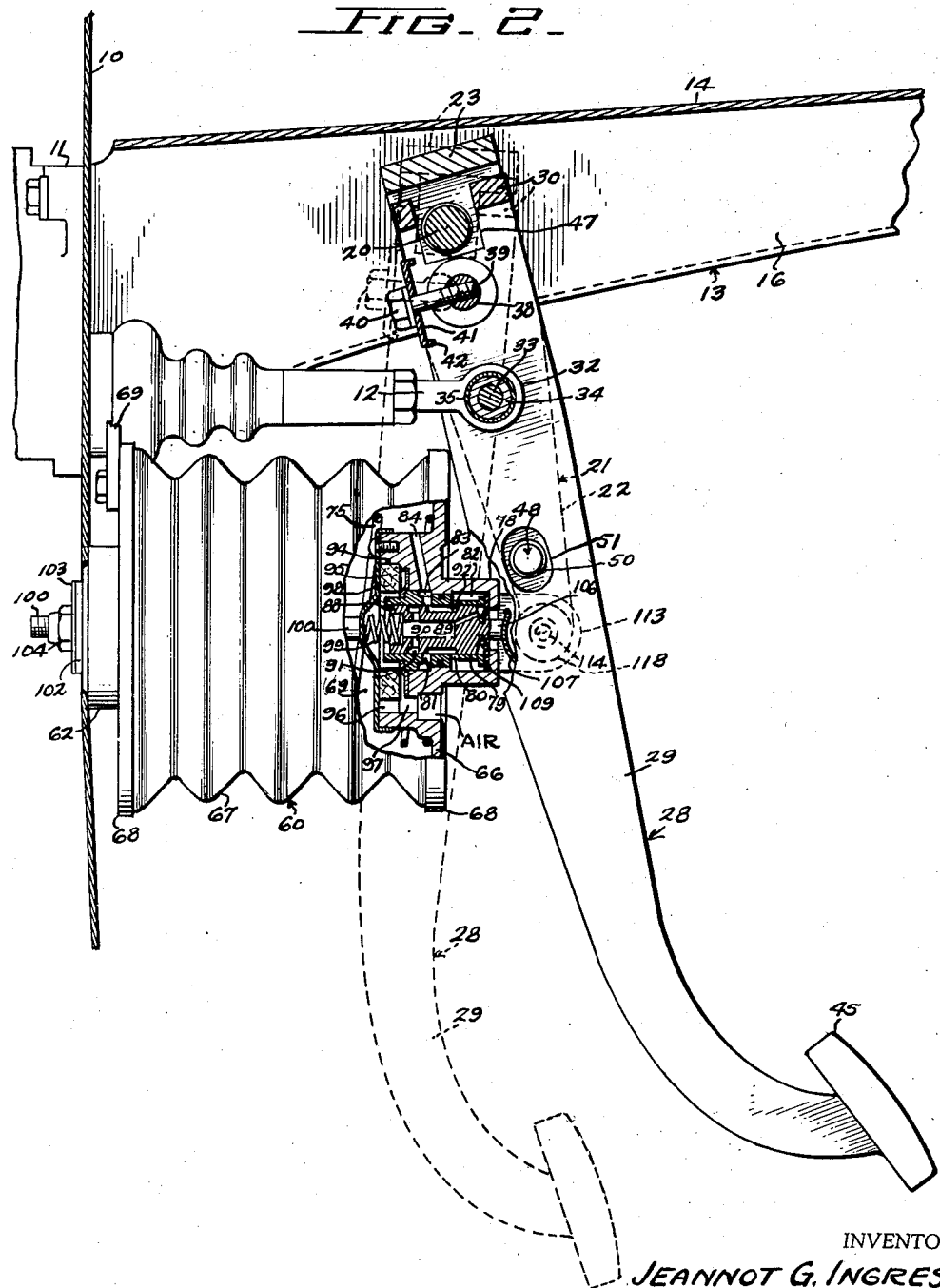

2,890,771
BOOSTER MOTOR CONTROL MECHANISM

Jeannot G. Ingres, Dearborn, Mich., assignor to Kelsey-Hayes Company, a corporation of Delaware Application October 20, 1954, Serial No. 463,492

8 Claims. (Cl. 188—152)

This invention relates to a booster motor control mechanism.

Several types of motor vehicles are now provided with hanging brake lever pedals, that is, pedals which depend from a pivot pin at the upper end thereof as distinguished from the prior practice of extending the brake lever through the toe board of the vehicle and pivoting the lever beneath the floor board.

In the co-pending application of David T. Ayers, Jr., and Edward Govan Hill, filed April 2, 1954, Serial No. 420,488, there is disclosed and claimed a novel type of booster brake mechanism particularly intended for use with depending pedal levers of the type referred to, and the present invention is an improvement over the construction shown in the pending application referred to.

In the co-pending application, a two-part lever is substituted for the standard single depending lever with one part of the two-part pedal lever operable for moving the valve of a booster motor arranged between the pedal lever and the fire wall of the vehicle. The other element of the two-part lever is connected to the push rod of a conventional master cylinder, and such other lever element is pivotally connected to and carried by the first-mentioned lever element. The two lever elements are so connected to each other than upon depression of the brake pedal, the booster motor is energized and power delivery and hydraulic pressure reactions are divided between the elements of the two-part lever.

An important object of the present invention is to improve and smooth out the operation of this type of mechanism by using the foot-operated element of the two-part lever to transmit both foot and power generated forces to the master cylinder to displace fluid therefrom and apply the vehicle brakes.

A further object is to provide such a mechanism in which, as distinguished from the structure in the co-pending application referred to, the power actuated lever element is mounted to turn on a fixed pivot and carries a pivot pin eccentric to the fixed pivot and supporting the pedal operated element of the two-part lever, thus eliminating use of eccentrically rocking means for transmitting motor forces to the push rod of the master cylinder.

A further object is to provide such an apparatus wherein the lever connections are simplified and wherein lost motion is provided between the lever elements whereby, upon a failure of power in the booster motor, the foot-operated lever element is operative for the application of the vehicle brakes.

A further object is to provide an arrangement of parts of the character referred to wherein the pivoting of the foot-operated lever element to the power-operated lever element shortens the foot-operated lever element, but wherein the supporting pin for the foot-operated lever element moves about the axis of the fixed pivot pin for the power-operated lever element whereby maximum brake application occurs within the normal range of movement of the pedal pad.

Other objects and advantages of the invention will become apparent during the course of the following description.

In the drawings I have shown one embodiment of the invention. In this showing:

Figure 1 is a side elevation of the mechanism with the elements shown in the fully off positions, parts of the motor and valve mechanism being broken away and the vehicle fire wall being shown in section, Figure 2 is a similar view showing the foot-operated lever element slightly moved from its normal off position to effect operation of the valve mechanism for energization of the motor, the foot pedal operated lever element being shown in dotted lines in a later stage of brake operation, Figure 3 is an end elevation of the mechanism, parts being shown in section, Figure 4 is a section taken substantially on line 4—4 of Figure 1, and Figure 5 is a similar view on line 5—5 of Figure 3.

Referring to Figures 1 and 2, the numeral 10 designates the fire wall of a motor vehicle against the forward face of which is mounted a conventional brake master cylinder 11 having therein the usual plunger (not shown) operable by a push rod 12. The fire wall 10 has secured thereto the forward end of a bracket 13 of substantially inverted U-shape (Figure 3) and including a top wall 14 and side walls 15 and 16. On certain types of motor vehicles, the bracket 13 is employed for pivotally supporting a depending brake pedal connected to the push rod 12 for the foot operation of the master cylinder.

In the present case, the bracket 13 carries a pivot pin 20 in the form of a bolt passing through the side walls 15 and 16, and the pivot pin supports a lever indicated as a whole by the numeral 21. This lever is of substantially inverted J-shape and comprises a depending body portion 22, an upper transverse portion 23 and a depending arm 24, the elements 22 and 24 of the lever being substantially spaced apart for a purpose which will become apparent. The spaced portions of the lever preferably are provided with bearing bushings 25 for the free rocking of the lever on the pivot pin 20.

Within the space between the lever portions 22 and 24 is arranged the upper extremity of a pedal lever indicated as a whole by the numeral 28. This lever also is of substantially inverted J-shape and comprises a depending elongated body portion 29 curved back upon itself as at 30 to provide a depending arm 31 spaced from the upper end portion of the body 29 to receive therebetween an eye 32 carried by the push rod 12. A screw 33 passes through the spaced portions of the lever 28 and is threaded into the body portion 29 thereof. A thimble 34 surrounds the central portion of the screw 33 and supports a bearing bushing 35. The eye 32 rocks on the bushing 35 as will be obvious.

Beneath the pivot pin 20, the lever portions 22 and 24 support a pivot pin 38 mounted to rock in bushings 38'. The pin 38 passes through the spaced upper portions of the pedal lever 28 and the pin 38 is fixed with respect to the pedal lever by a screw 39 threaded into the pin 38 and having a head 40 overlying a clip 41 seating against the adjacent edge portions of the pedal lever and provided with positioning lips 42 extending into the space between the parallel upper portions of the pedal lever. It will be apparent that the pivot pin 38 is fixed against endwise movement by the screw 39 and that opposite ends of the pin 38 are maintained clear of the bracket side walls 15 and 16. Accordingly, the pin 38 is free to swing back and forth bodily about the axis of the pivot pin 20, as will become more apparent below.

It will be apparent that the push rod 12 for the master cylinder is directly pivotally connected to the pedal lever. The body 29 of this lever is provided at its lower end with a pedal pad 45. This pedal pad and the lever portion 29 occupy the same positions relative to the vehicle parts as the conventional depending pedal lever employed with vehicles of the type referred to.

As shown in Figure 2, the looped upper end portion of the pedal lever 28 is cut away as at 47 to provide adequate space for the pivot pin 20. Thus it will be apparent that the pedal lever is adapted to swing about the axis of the pivot pin 38 within reasonable limits wholly free of the lever 22. Relative swinging movement between these two levers is limited, not by engagement of the pivot pin 20 with the cut-away 47, but through the medium of a stop pin indicated as a whole by the numeral 48. This pin comprises a shank 49 reduced at its left-hand end as viewed in Figure 3 to be received within a resilient sleeve 50 engageable with opposite sides of a slot 51 formed in the pedal lever arm 29. The resilient sleeve 50 silences contact between the pin 48 and either side of the slot 51. The shank 49 further includes an enlarged head 54 engageable against one face of the lever arm 22. The pin 48 is further provided with a reduced threaded shank 55 projecting from the head 54 eccentrically thereof through the lever arm 22 and provided with a clamping nut 56. The purpose of the eccentric portion of the pin is to permit rotation of the pin, upon loosening of the nut 56, to adjust clearance between the resilient sleeve 50 and the slot 51 for a purpose which will become apparent.

Referring particularly to Figure 1, the numeral 60 designates a fluid pressure operated motor as a whole. This motor comprises a forward stationary wall 61 cushioned with respect to the fire wall 10 as at 62 and fixed to a bracket 63 having bolts 64 for securing it to the fire wall 10 to support the wall 61 in fixed position. The motor further comprises a rear movable wall 66 spaced from the wall 61, and a rubber or similar bellows 67 is secured at its ends to the walls 61 and 66 by clamping rings 68. The walls 61 and 66 and bellows 67 define therewithin a variable pressure chamber 69, the pressures in which are controlled by a valve mechanism to be described.

Certain of the convolutions of the bellows 67 are provided with subtending rings 72. Between such rings is preferably arranged another subtending ring 73 formed integral with an inner cylindrical element 74 surrounding and engageable with a motor return spring 75. Opposite ends of this spring contact respectively with the motor walls 61 and 66 to urge the wall 66 toward the right as viewed in Figure 1.

Preferably formed integral with the motor wall 66 is a valve housing 78 carrying therein a sleeve 79 having longitudinally spaced sets of ports 80 and 81. These ports respectively are in fixed communication with annular chambers 82 and 83 surrounding the valve sleeve 79. The chamber 83 communicates with the motor chamber 69 through a passage 84. The chamber 82 (Figure 4) opens into a port 85 which communicates with one end of a pipe 86 leading to a suitable source of vacuum such as the intake manifold of the motor vehicle engine.

A valve 88 is slidable in the sleeve 79 and is provided with an axial passage 89 communicating through ports 90 with an annular groove 91 normally in communication with the ports 81 in the sleeve 79. The latter ports accordingly are normally open to the atmosphere in a manner which will become apparent. The valve 88 is further provided with an external elongated annular groove 92 in fixed communication with the sleeve ports 80, which ports, in turn, are in fixed communication with the source of vacuum through chamber 82, port 85 and pipe 86.

The left-hand end of the axial valve recess 89 is in open communication with the adjacent open end of the sleeve 79 which, in turn, is open to an annular recess 94 formed in the adjacent end of the valve housing within the motor. Within such recess is mounted an annular air cleaner 95 substantially surrounded by a space 96, open to the atmosphere through a port 97.

Against the inner face of the valve housing is secured a plate 98 which holds the air cleaner 95 in position. A spring 99 is interposed between the plate 98 and the valve 88 to urge the latter to its off position shown in Figure 1.

To avoid any tendency for the bellows 67 to sag intermediate its ends, a rod 100 is welded at one end to the plate 98 axially thereof and projects through a bearing 101 carried by the motor wall 61. A pressure seal 102 is interposed between the bearing 101 and the motor chamber 69. Forwardly of the bearing 101, the rod 100 is surrounded by a cushion 102' against which is arranged a washer 103 engaged by a nut 104 threaded on the rod 100. This rod slides through the bearing 101 when the motor is energized and while it is being de-energized for the return of the parts to their normal positions, and the cushion 102' serves to silence return movement of the rod 100 when the parts return to normal positions.

The valve 88 is provided with a rearwardly extending button 106 projecting from the valve housing 78. The button 106 engages a curved lateral extension 107 (Figure 5) carried by a washer 108 preferably welded to the lever arm 29. It will be apparent therefore that when the pedal pad is depressed, the lateral extension 107 acts as an operating element to move the valve 88 to the left as viewed in Figures 1 and 2. A flexible seal 109 is preferably employed to prevent any leakage of air into the valve housing through which the button 106 projects, this element being clearly shown in Figure 5.

The vacuum port 85 is formed in a lateral extension 112 formed integral with the valve housing 78, and this extension is provided with an integral longitudinal extension 113, off-set from the axis of the motor. Through the extension 113 projects a threaded shank 114 of a pin 115 mounted in a bushing 116 carried by a sleeve 117 fixed to the lower end portion of the lever arm 22. The pin 115 is headed as at 118 and has its end adjacent the reduced shank 114 seated against a washer 119 which is drawn tight against the extension 113 upon the tightening of a nut 120 threaded on the shank 114.

*Operation*

The parts normally occupy the positions shown in Figure 1. It will be noted that the projection 113, being connected to the shank 114 (Figure 3), will support the motor head 66. The stationary head 61, of course, is supported through its connection with the fire wall. However, it is possible for the central portion of the bellows 67 to sag, possibly with the head 66 tilting from the vertical. The rod 100 maintains the axial alinement of the valve parts and tends to thereby assist in preventing the sagging of the central portion of the bellows. Moreover, the return spring 75 projects through the cylindrical element 74 and the spring accordingly also tends to support the bellows in proper position.

It will be noted that the pin 48 normally is arranged toward the left-hand side of the slot 51 when the parts are in the off positions in Figure 1. When the brakes are to be operated, the operator will push downwardly and forwardly on the pedal pad and in the initial movement of the parts, the pedal lever 28 will turn about the axis of the pin 38, thus moving the left-hand side of the slot 51 away from the pin 48, for example, as shown in solid lines in Figure 2.

In the normal position of the valve 88, the motor chamber 69 is in fixed communication with the atmosphere through passage 84, ports 81 and 90 and their associated grooves, and thence through passage 89 in the valve and through the air cleaner and port 97. Upon initial movement of the pedal lever as referred to above, the valve groove 91 will be moved out of registration with the sleeve ports 81 to disconnect the motor chamber from the atmosphere. The valve groove 92 will be moved to the position shown in Figure 2 to connect the ports 80 and 81, thus connecting the motor chamber to the source of vacuum. With the valve in the position shown in Figure 2, therefore, the motor is ready to start its operation and the movement of the pedal lever 28 will have taken place by rocking about the axis of the pin 38 independently of the lever 21.

As soon as the motor chamber 69 is connected to the source of vacuum, atmospheric pressure acting on the external face of the motor head 66 will start to move this member toward the left in Figures 1 and 2, and this movement will be transmitted through the extension 113 to the pin 115 and thus the lever 21 will start to turn about the axis of its supporting pin 20.

The lever arm represented by the distance between the pins 33 and 38 is quite short relative to the lever arm between the pin 33 and the pedal pad. If the pedal lever turned about the axis of the pin 38 throughout the operation of the device, the rod 12 and the master cylinder plunger would be moved a distance insufficient to displace the required amount of fluid for full brake application. It will be apparent however that when the motor is energized, the lever 21 will be turned about the axis of the pivot pin 20, and since the lever 21 carries the pivot pin 38, the latter will move toward the left in Figures 1 and 2, the axis of the pin 38 turning in an arc of a circle about the axis of the pin 20. This materially increases the distance of movement of the pin 33 for a given distance of movement of the pedal pad, thus providing the required movement of the master cylinder plunger with adequate displacement of hydraulic fluid into the brake system.

While the lever 21 operates to bodily move the pin 38, it will be apparent that the motor will apply a force to the pin 38 to move it to the left while the operator is applying direct foot pressure to the pin 33 to operate the master cylinder. Thus the combined forces of the operator's foot and the motor will operate to displace fluid from the master cylinder and apply the brakes. Accordingly, the motor acts as a booster and at the same time bodily shifts the pin 38 to provide for hydraulic fluid displacement to the extent necessary for full brake application.

In the co-pending application referred to, the lever arm between the pivotal support of the pedal lever and the point of connection of such lever with the master cylinder is proportionately longer than in the present case, and motor forces are utilized by rocking movement of an eccentric pin carried by the pedal level. This provided for the proper distance of movement of the push rod in the master cylinder, but complicated the mechanism somewhat in the provision of the eccentric rocking means, which is eliminated in the present case. It will be noted that the present construction involves simple pivotal connections and that all forces transmitted to the master cylinder are applied directly from the pedal lever through the pin 33. In practice, therefore, it is found that an improved operation is provided, the operation being smoother and more uniform in the progressive application of forces to the master cylinder piston.

It will be noted that a direct pedal lever force is transmitted to the valve to move it from its normal off position and that in applying such force to the valve, it is necessary to overcome solely the light resistance of the spring 99. The apparatus accordingly provides a highly desirable "soft" pedal and the general operation of the device is wholly free from any feeling of unevenness or "lumpiness."

It will be obvious without detailed explanation that the valve mechanism provides for a perfect follow-up operation of the motor head 66 relative to movement of the pedal lever. This is true not only during the operation of applying the brakes, but also in gradually releasing them.

When the brake pedal is released, the spring 99 promptly returns the valve 88 to its off position relative to the sleeve 79. Accordingly, the motor chamber 69 will be opened to the atmosphere and will be completely cut off from the source of vacuum. Atmospheric pressure will be established in the motor chamber 69 and the return spring 75 will return the motor head to its normal position shown in Figure 1, movement to such position being limited by engagement of the cushion 102 with the bearing 101.

Up to a certain point in the operation of the brakes, the pin 48 will be at least slightly spaced from the right-hand side of the slot 51 as viewed in Figures 1 and 2. The point of maximum motor energization occurs prior to a full brake operation. After such point is reached, further force applied to the pedal pad will move the pedal lever 28 and engage the right-hand side of the slot 51 with the pin 48. During further operation of the brake pedal, therefore, the two levers 21 and 28 will turn as a unit about the axis of the pin 20 and the operator will directly assist the motor in effecting a full brake application.

In the event of a failure of power for the motor, movement of the pedal pad from its normal off position will cause the right-hand side of the slot 51 as viewed in Figures 1 and 2 to directly engage the pin 48. The two levers 21 and 28 will then turn as a unit in accordance with foot-applied pressure on the pedal pad and the pin 33 will move the full distance necessary for the displacement of fluid from the master cylinder, since the effective upper lever arm for moving the push rod 12 will now be represented by the distance between the axes of the pins 20 and 33.

It is to be understood that the form of the invention illustrated and described is to be taken as a preferred example of the same, and that the scope of the invention is defined in the appended claims.

I claim:

1. A booster motor control mechanism for use with a device to be operated having an operating rod, comprising a first lever comprising an enlongated depending arm, the upper end of said lever being turned downwardly to form a short arm spaced from said elongated arm, a fixed pivot pin through said arms and supporting said first lever for swinging movement on the axis of said pin, a second lever having an elongated depending arm having a pedal pad at its lower end, the upper end of said second lever being turned downwardly at its upper end to form a relatively short arm, the upper portion of said second lever being arranged in the space between the arms of said first lever, a second pivot pin carried at its ends by the arms of said first lever below said fixed pivot pin, a power transmitting pin mounted between the arms of said second lever below said second pivot pin, for pivotally connecting said projecting end of said operating rod to said arms of said second lever, a differential fluid pressure operated motor having a pressure responsive unit connected to the lower end of said elongated arm of said first lever, a valve mechanism for controlling differential pressures affecting said pressure responsive unit, said valve mechanism including a valve part provided with an end projecting from said motor, and means carried by said elongated arm of said second lever and engageable with said projecting end of said valve part to move the latter to a position establishing differential pressures on opposite sides of said pressure responsive unit upon movement of said pedal pad away from a normal off position.

2. Apparatus constructed in accordance with claim 1 wherein the elongated ends of said levers are provided respectively with a pin and a slot receiving said pin, said pin normally having lost motion relative to said slot for movement of said pedal pad from its normal off position a predetermined distance before said pin engages said slot to limit relative normal turning movement between said levers.

3. Apparatus constructed in accordance with claim 1 wherein said motor comprises a fixed wall, a movable wall spaced therefrom and constituting said pressure responsive unit and a bellows connected between said motor walls and defining therewith a variable pressure motor chamber, said movable valve element normally occupying a position connecting said chamber to the atmosphere and being movable upon operation of said pedal pad to connect said motor chamber to a source of vacuum, said second lever supporting said bellows through said movable wall and said fixed pivot pin supporting said first lever.

4. Apparatus constructed in accordance with claim 1 wherein said motor comprises a fixed wall, a movable wall spaced therefrom and constituting said pressure responsive unit and a bellows connected between said motor walls and defining therewith a variable pressure motor chamber, said movable valve element normally occupying a position connecting said chamber to the atmosphere and being movable upon operation of said pedal pad to connect said motor chamber to a source of vacuum, said valve mechanism being carried by said movable wall and comprising a valve sleeve fixed to said movable wall, said valve part comprising a valve element slidable in said sleeve, the projecting end of said valve part comprising a button projecting from said movable wall.

5. Apparatus constructed in accordance with claim 1 provided with a stationary bracket having spaced side walls between which the upper end of said first lever is arranged, said fixed pivot pin being carried by said spaced walls and projecting through the spaced arms of said first lever free of engagement with the upper end of said second lever.

6. Apparatus constructed in accordance with claim 1 provided with a stationary bracket having spaced side walls between which the upper end of said first lever is arranged, said fixed pivot pin being carried by said spaced walls and projecting through the spaced arms of said first lever free of engagement with the upper end of said second lever, said second pivot pin being carried by the spaced arms of said first lever between said spaced side walls, and means carried by said second lever for fixing said second pin against movement relative to said second lever to maintain clearance between the ends of said second pivot pin and said side walls.

7. A booster motor control mechanism for use with a device to be operated comprising a pair of depending levers one of which is pivotally suspended at its upper end for turning movement on a fixed pivot axis, the other of said levers being a pedal lever including a lower pedal pad, a power transmitting pivot pin intermediately of said pedal lever at a point spaced below said fixed pivot axis for connection to said device to be operated, means pivotally suspending said pedal lever from said one lever between said fixed pivot axis and said power transmitting pivot pin, a fluid pressure motor having a pressure movable wall pivotally connected to said one lever at a point spaced below said power transmitting pivot pin, a follow-up control valve mechanism having a valve part occupying a normal position balancing pressures on opposite sides of said wall and movable from such position to establish differential pressures on opposite sides of said wall, and means carried by said pedal lever and engaging said valve part to effect movement thereof from its normal position upon operation of said pedal lever, said levers being respectively provided with a stop pin and a slot in which said stop pin is arranged, said pedal lever being movable independently of said one lever to move said valve part away from normal position, said stop pin being engageable with a side of said slot to limit turning movement of said pedal lever relative to said one lever whereby, upon a failure of power in said motor, said levers will turn as a unit about said fixed axis.

8. A booster motor control mechanism for use with a device to be operated in a substantially horizontal path of movement comprising a pair of levers, one of which is suspended for turning movement at its upper end about a fixed pivot axis, the other lever being a pedal lever including a lower pedal pad, a power transmitting pivot pin intermediately of said pedal lever and substantially below said fixed pivot axis for connection to said device to be operated, a pivot pin suspending said pedal lever from said one lever between said fixed pivot axis and said power transmitting pivot pin, a fluid pressure motor having a stationary wall, a movable wall and a flexible bellows connecting said walls and defining therebetween a variable pressure motor chamber, a valve mechanism having a movable valve part normally occupying a position connecting said motor chamber to the atmosphere and movable from such position to connect said motor chamber to a source of subatmospheric pressure, means connecting said movable wall to said one lever at a point spaced substantially below said power transmitting pivot pin, and means carried by said pedal lever and engaging said valve part to effect movement thereof from its normal position upon operation of said pedal lever, said levers being respectively provided with a slot and a stop pin, said pedal lever being initially operable independently of said one lever to move said valve part from its normal off position, said stop pin being engageable with a side of said slot after predetermined movement of said pedal lever relative to said one lever, whereby, upon a failure of power for said motor, said levers will turn as a unit about said fixed axis.

References Cited in the file of this patent

UNITED STATES PATENTS

| | | |
|---|---|---|
| 2,107,110 | Eaton et al. | Feb. 1, 1938 |
| 2,181,757 | Fitzgerald | Nov. 28, 1939 |
| 2,207,700 | Porter | July 16, 1940 |
| 2,265,546 | Price | Dec. 9, 1941 |
| 2,358,753 | Willett et al. | Sept. 19, 1944 |
| 2,365,960 | Ingres | Dec. 26, 1944 |
| 2,706,020 | Freers et al. | Apr. 12, 1955 |

FOREIGN PATENTS

| | | |
|---|---|---|
| 307,831 | Great Britain | June 5, 1930 |